:::info
(12) United States Patent
Jeong et al.

(10) Patent No.: US 8,112,380 B2
(45) Date of Patent: *Feb. 7, 2012
:::

(54) SITUATION-AWARE THRESHOLDING FOR RECOMMENDATION

(75) Inventors: Sangoh Jeong, Palo Alto, CA (US); Doreen Cheng, San Jose, CA (US); Yu Song, Pleasanton, CA (US); Swaroop Kalasapur, Santa Clara, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/226,309

(22) Filed: Sep. 6, 2011

(65) Prior Publication Data
US 2011/0319053 A1    Dec. 29, 2011

Related U.S. Application Data

(63) Continuation of application No. 12/109,927, filed on Apr. 25, 2008, now Pat. No. 8,037,007.

(51) Int. Cl.
*G06F 17/00* (2006.01)
*G06N 5/02* (2006.01)

(52) U.S. Cl. .......................................... 706/48
(58) Field of Classification Search ............... 706/48
See application file for complete search history.

(56) References Cited

PUBLICATIONS

J A. Flanagan. "*Unsupervised Clustering of Context Data and Learning User Requirements for a Mobile Device*", 5th Intl' and Interdisp. Conf. on Modeling and Using Context (Context-05), pp. 155-168, 2005.

Jonathan L. Herlocker, Joseph A. Konstan, A1 Borchers, and John Riedl, "*An Algorithmic Framework for Performing Collaborative Filtering*", Proceedings of the 22nd annual international ACM SIGIR conference on Research and development in information retrieval (1999) vol. 54, Issue: 13. September, Publisher: ACM, pp. 230-237.

A. I. Schein, A. Popescul, and L. H. Ungar, "*Methods and Metrics for Cold-Start Recommendations*," In Proceedings of the 25th Annual International ACM SIGIR Conference on Research and Development in Information Retrieval (SIGIR 2002) (2002), pp. 253-260.

Chen et al., "*A Survey of Context-Aware Mobile Computing Research*," Dartmouth Computer Science Technical Report TR2000-381, Dartmouth College, 2000.

S. Yau, H. Liu, D. Huang, and Y. Yao, "*Situation-aware Personalized Information Retrieval for Mobile Internet*," Proc. of the 27th AnnualInt'l Comp. Soft. and Application Conference, 2007, pp. 1-6.

*Primary Examiner* — Jeffrey A Gaffin
*Assistant Examiner* — Vincent Gonzales
(74) *Attorney, Agent, or Firm* — Beyer Law Group LLP

(57) ABSTRACT

In one embodiment, data relating to usage patterns of the user is stored, wherein the data includes information as to items which were used and the context in which they were used. The data is then clustered into clusters of data points. Then a centroid is determined for each of the clusters. A cluster similar to a current context of the user is selected by comparing a data point representing the current context of the user to one or more of the centroids. For each of one or more items, a threshold based on values for a plurality of the centroids with respect to the corresponding item, wherein a threshold is used to compare with centroid value of an item in a selected cluster to determine whether to recommend the item.

20 Claims, 9 Drawing Sheets

| Time | Loc. | Temp | Email | Web | Note |

| Applications: | A1 | A2 | A3 | A4 | A5 | A6 | A7 | A8 | A9 |
|---|---|---|---|---|---|---|---|---|---|
| Centroid Values: | 0.1667 | 0.2556 | 0.6556 | 0.4667 | 0.3333 | 0.5111 | 0.0111 | 0.0889 | 0.3222 |

If $A_i$ > Threshold = 0.25 then $R_i$ = 1. Otherwise, $R_i$ = 0

| R1 | R2 | R3 | R4 | R5 | R6 | R7 | R8 | R9 |
|---|---|---|---|---|---|---|---|---|
| 0 | 1 | 1 | 1 | 1 | 1 | 0 | 0 | 1 |

Recommendations

FIG. 8

SITUATION-AWARE THRESHOLDING FOR RECOMMENDATION

CROSS-REFERENCE TO RELATED APPLICATIONS

This application is a continuation of prior, co-pending U.S. application Ser. No. 12/109,927, filed on Apr. 25, 2008, which is incorporated herein by reference in its entirety for all purposes.

BACKGROUND OF THE INVENTION

1. Field of the Invention

The present invention relates to software applications. More particularly, the present invention relates to thresholding for situation-aware recommendation of items.

2. Description of the Related Art

Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information used by a computing system is stored in a computer readable memory using a digital or binary form. More complex computing systems can store content including the computer program itself. A computer program may be invariable and/or built into, for example a computer (or computing) device as logic circuitry provided on microprocessors or computer chips. Today, general purpose computers can have both kinds of programming. A computing system can also have a support system which, among other things, manages various resources (e.g., memory, peripheral devices) and services (e.g., basic functions such as opening files) and allows the resources to be shared among multiple programs. One such support system is generally known as an Operating System (OS) which provides programmers with an interface used to access these resources and services.

Today, numerous types of computing devices are available. These computing devices widely range with respect to size, cost, amount of storage and processing power, from the expensive and powerful servers, relatively cheaper Personal Computers (PC's) and laptops, to more inexpensive microprocessors or computer chips provided in storage devices, automobiles, and household electronic appliances.

In recent years, computing systems have become more portable and mobile. As a result, various mobile and handheld devices have been made available. By way of example, wireless phones, media players, Personal Digital Assistants (PDA's) are widely used today. Generally, a mobile or a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface.

In particular, mobile communication devices (e.g., mobile phones) have become extremely popular. Some mobile communication devices (e.g., Smartphones) offer computing environments that are similar to that provided by a Personal Computer (PC). As such, a Smartphone can effectively provide a complete operating system as a standardized interface and platform for application developers. Given the popularity of mobile communication devices, telecommunication is discussed in greater detail below.

Generally, a mobile phone or cell phone can be a long-range, portable electronic device used for mobile communication. In addition to the standard voice function of a telephone, current mobile phones can support many additional services such as SMS for text messaging, email, packet switching for access to the Internet, and Multimedia Messaging Service (MMS) for sending and receiving photos and video. Most current mobile phones connect to a cellular network of base stations (cell sites), which is in turn interconnected to the public switched telephone network (PSTN) (one exception is satellite phones).

The Short Message Service (SMS), often called text messaging, is a means of sending short messages to and from mobile phones. SMS was originally defined as part of the GSM series of standards in 1985 as a means of sending messages of up to 160 characters, to and from Global System for Mobile communications (GSM) mobile handsets. Since then, support for the service has expanded to include alternative mobile standards such as ANSI CDMA networks and Digital AMPS, satellite and landline networks. Most SMS messages are mobile-to-mobile text messages, though the standard supports other types of broadcast messaging as well. The term SMS is frequently used in a non-technical sense to refer to the text messages themselves, particularly in non-English-speaking European countries where the GSM system is well-established.

Multimedia Messaging Service (MMS) is a relatively more modern standard for telephony messaging systems that allows sending messages that include multimedia objects (images, audio, video, rich text) and not just text as in Short Message Service (SMS). It can be deployed in cellular networks along with other messaging systems like SMS, Mobile Instant Messaging and Mobile E-mail. Its main standardization effort is done by 3GPP, 3GPP2 and Open Mobile Alliance (OMA).

There are many circumstances in which it would be beneficial for a computer or other electronic device to be able to recommend software applications or other items for a user to download, install, and/or utilize in other ways. Once such circumstance is where the user is operating a mobile device. The display and interface limitations of such devices make it difficult for users to perform significant searching for applications using them. For example, a user may be shopping and desire to utilize a price comparison software application on his mobile device. However, it would be difficult for the user to navigate the Internet and/or a directory of available software applications using the mobile device. In such cases, it would be beneficial to recommend to the user a small set of software applications.

SUMMARY OF THE INVENTION

In one embodiment, data relating to usage patterns of the user is stored, wherein the data includes information as to items which were used and the context in which they were used. The data is then clustered into clusters of data points. Then a centroid is determined for each of the clusters. A cluster similar to a current context of the user is selected by comparing a data point representing the current context of the user to one or more of the centroids. For each of one or more items, a threshold based on values for a plurality of the centroids with respect to the corresponding item, wherein a threshold is used to compare with centroid value of an item in a selected cluster to determine whether to recommend the item.

In another embodiment, data relating to usage patterns of the user is stored, wherein the data includes information as to items which were used and the context in which they were used. The data is then clustered into clusters of data points. Then a centroid is determined for each of the clusters. A cluster similar to a current context of the user is selected by comparing a data point representing the current context of the user to one or more of the centroids. A general threshold is computed based on values for the plurality of the centroids with respect to a plurality of possible items to recommend, wherein the a general threshold is used to compare with centroid value of an item in a selected cluster to determine whether to recommend the item.

In another embodiment, an apparatus is provided comprising: an interface; and one or more processors configured to: store data relating to usage patterns of the user, wherein the data includes information as to items which were used and the context in which they were used; cluster the data into clusters of data points; determine a centroid for each of the clusters; select a cluster similar to a current context of the user by comparing a data point representing the current context of the user to one or more of the centroids; and compute, for each of one or more items, a threshold based on values for a plurality of the centroids with respect to the corresponding item, wherein a threshold is used to compare with centroid value of an item in a selected cluster to determine whether to recommend the item.

In another embodiment, an apparatus is provided comprising: an interface; and one or more processors configured to: store data relating to usage patterns of the user, wherein the data includes information as to items which were used and the context in which they were used; cluster the data into clusters of data points; determine a centroid for each of the clusters; select a cluster similar to a current context of the user by comparing a data point representing the current context of the user to one or more of the centroids; and compute a general threshold based on values for the plurality of the centroids with respect to a plurality of possible items to recommend, wherein the general threshold is used to compare with centroid value of an item in a selected cluster to determine whether to recommend the item.

In another embodiment, a system is provided for making recommendations to a user, the system comprising: means for storing data relating to usage patterns of the user, wherein the data includes information as to items which were used and the context in which they were used; means for clustering the data into clusters of data points; means for determining a centroid for each of the clusters; means for selecting a cluster similar to a current context of the user by comparing a data point representing the current context of the user to one or more of the centroids; and means for computing, for each of one or more items, a threshold based on values for a plurality of the centroids with respect to the corresponding item, wherein a threshold is used to compare with centroid value of an item in a selected cluster to determine whether to recommend the item.

In another embodiment, a system is provided for making recommendations to a user, the system comprising: means for storing data relating to usage patterns of the user, wherein the data includes information as to items which were used and the context in which they were used; means for clustering the data into clusters of data points; means for determining a centroid for each of the clusters; means for selecting a cluster similar to a current context of the user by comparing a data point representing the current context of the user to one or more of the centroids; and means for computing a general threshold based on values for the plurality of the centroids with respect to a plurality of possible items to recommend, wherein the general threshold is used to compare with centroid value of an item in a selected cluster to determine whether to recommend the item.

In another embodiment, a program storage device readable by a machine tangibly embodying a program of instructions executable by the machine is provided to perform a method for making recommendations to a user, the method comprising: storing data relating to usage patterns of the user, wherein the data includes information as to items which were used and the context in which they were used; clustering the data into clusters of data points; determining a centroid for each of the clusters; selecting a cluster similar to a current context of the user by comparing a data point representing the current context of the user to one or more of the centroids; and computing, for each of one or more items, a threshold based on values for a plurality of the centroids with respect to the corresponding item, wherein a threshold is used to compare with centroid value of an item in a selected cluster to determine whether to recommend the item.

In another embodiment, a program storage device readable by a machine tangibly embodying a program of instructions executable by the machine is provided to perform a method for making recommendations to a user, the method comprising: storing data relating to usage patterns of the user, wherein the data includes information as to items which were used and the context in which they were used; clustering the data into clusters of data points; determining a centroid for each of the clusters; selecting a cluster similar to a current context of the user by comparing a data point representing the current context of the user to one or more of the centroids; and computing a general threshold based on values for the plurality of the centroids with respect to a plurality of possible items to recommend, wherein the general threshold is used to compare with centroid value of an item in a selected cluster to determine whether to recommend the item.

BRIEF DESCRIPTION OF THE DRAWINGS

FIG. 1 is a diagram illustrating an example vector storing context and usage information for a single data point.

FIG. 8 is a diagram illustrating an example of a single threshold for all possible item to recommend in accordance with an embodiment of the present invention.

DETAILED DESCRIPTION OF SPECIFIC EMBODIMENTS

Figure 2:
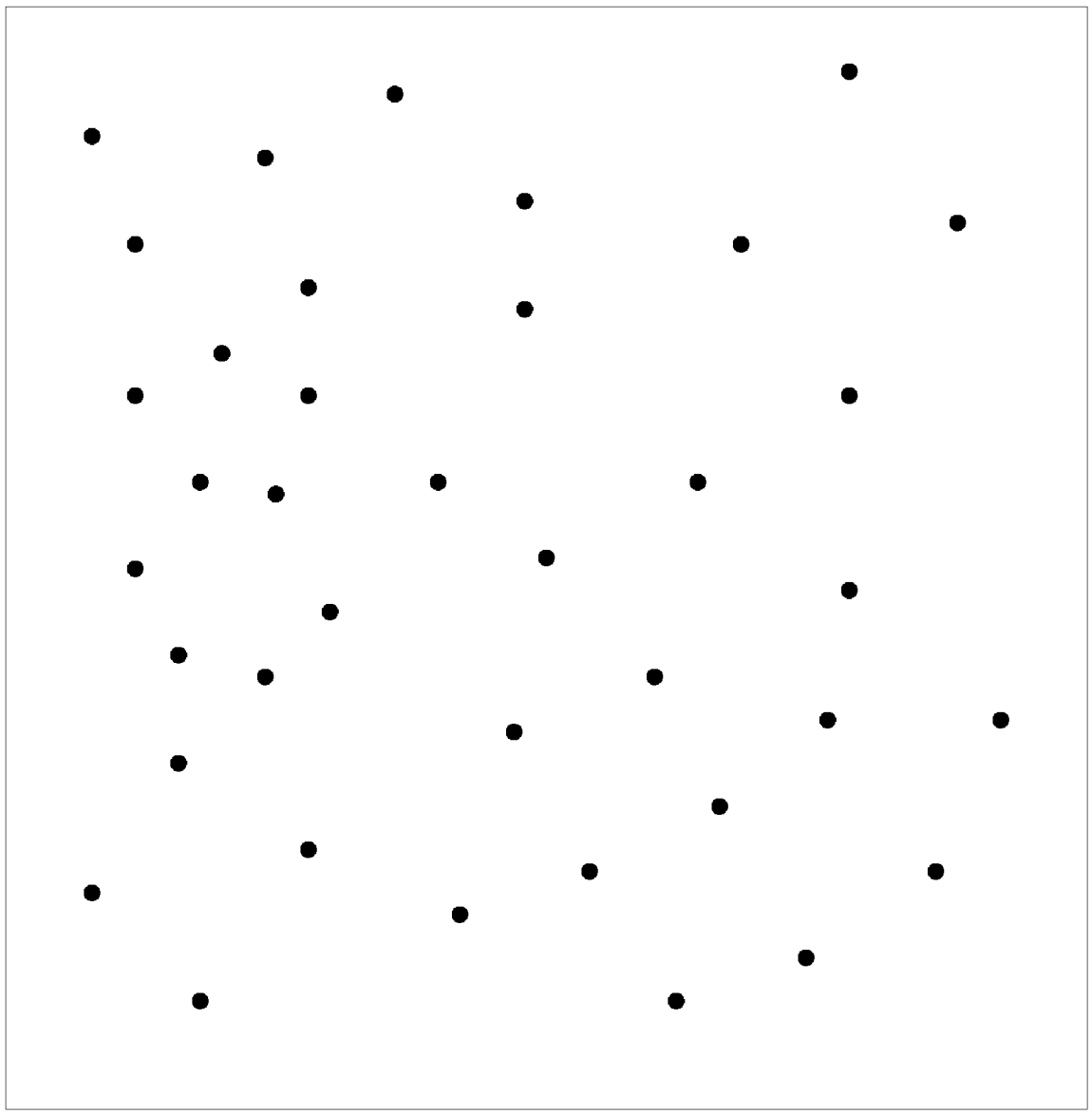
FIG. 2 is a diagram illustrating an example graph.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

In an embodiment of the present invention, software applications or other items may be automatically recommended to the user based on data related to the current context and past usage information. Context refers to the situation in which the user and/or device the user is operating. For example, the context may include the location of the user—whether the user is home, at the office, or elsewhere. The context may also include the time of day—for example, whether it is morning, afternoon, or evening. One of ordinary skill in the art will recognize that there may be many other types of information captured by the context and nothing in this document shall be read as limiting the invention to any particular type of information.

One way for a system to provide software recommendations would be to let a user specify his or her preferences, and use the preferences to guide application/service recommendations. For example, a user may indicate a preference for business-related software, and the system may use this information to err on the side of recommending business-related software applications. Thus, for example, if the choice is between a game application and a word processing application, the system would recommend a word processing application. This solution, however, suffers from the drawback that user studies have shown that few users would bother to specify preferences, as such there is simply no data from which to extract such a recommendation. Furthermore, even when preferences are specified, user preferences are usually situation-dependent, i.e., a user's preferences vary from situation to situation. For example, while a user may have a preference for business-related software while at work or during the daytime, the same user may have a preference for entertainment-related software while at home. In another example, at evening at home on a rainy day, the user may want to cook dinner and watch news, and may prefer software applications related to those tasks, while at a similar time at the office and in a meeting, the user may want to call home and arrange for food to be picked up on the way home. The preference-based approach to recommendations, used alone, simply does not provide the level of granularity needed to be effective for real-world uses.

Other approaches require the user to effectively train the device over a period of time ("supervised training"). However, supervised training may not be an ideal or a desired solution for many applications as it requires the use to spend a significant amount of time and effort to actively train the device. Another drawback is that conventional approaches are not flexible and do not readily adapt to changes in preferences, environment, or habits associated with the use of the device. Therefore, improved techniques for enhancing mobile devices and/or their use are needed.

As such, in an embodiment of the present invention, context information is captured and utilized in the application-recommending process. Data relating to previous usage information may be collected and stored as data points. The data point information may be stored in vectors. In an embodiment of the present invention, both the context and the usage information are stored in the vector. FIG. 1 is a diagram illustrating an example vector storing context and usage information for a single data point. In this example, context information includes time 100, location 102, and temperature 104. Usage information indicates which applications the user operated, including email 106, web browsing 108, and notepad 110.

Each data point may also be visualized as a point on a two-dimensional graph. FIG. 2 is a diagram illustrating an example graph. The proximity of data points to one another on the graph indicates the level of similarity of their vectors. In an embodiment of the present invention, these data points may be grouped into clusters of similar data points. Clustering is the classification of objects into different groups, or more precisely, the partitioning of a data set into subsets (clusters), so that the data in each subset (ideally) share some common trait—often proximity according to some defined distance measure. These clusters may then be utilized in aiding the system select appropriate applications to recommend.

Figure 3:
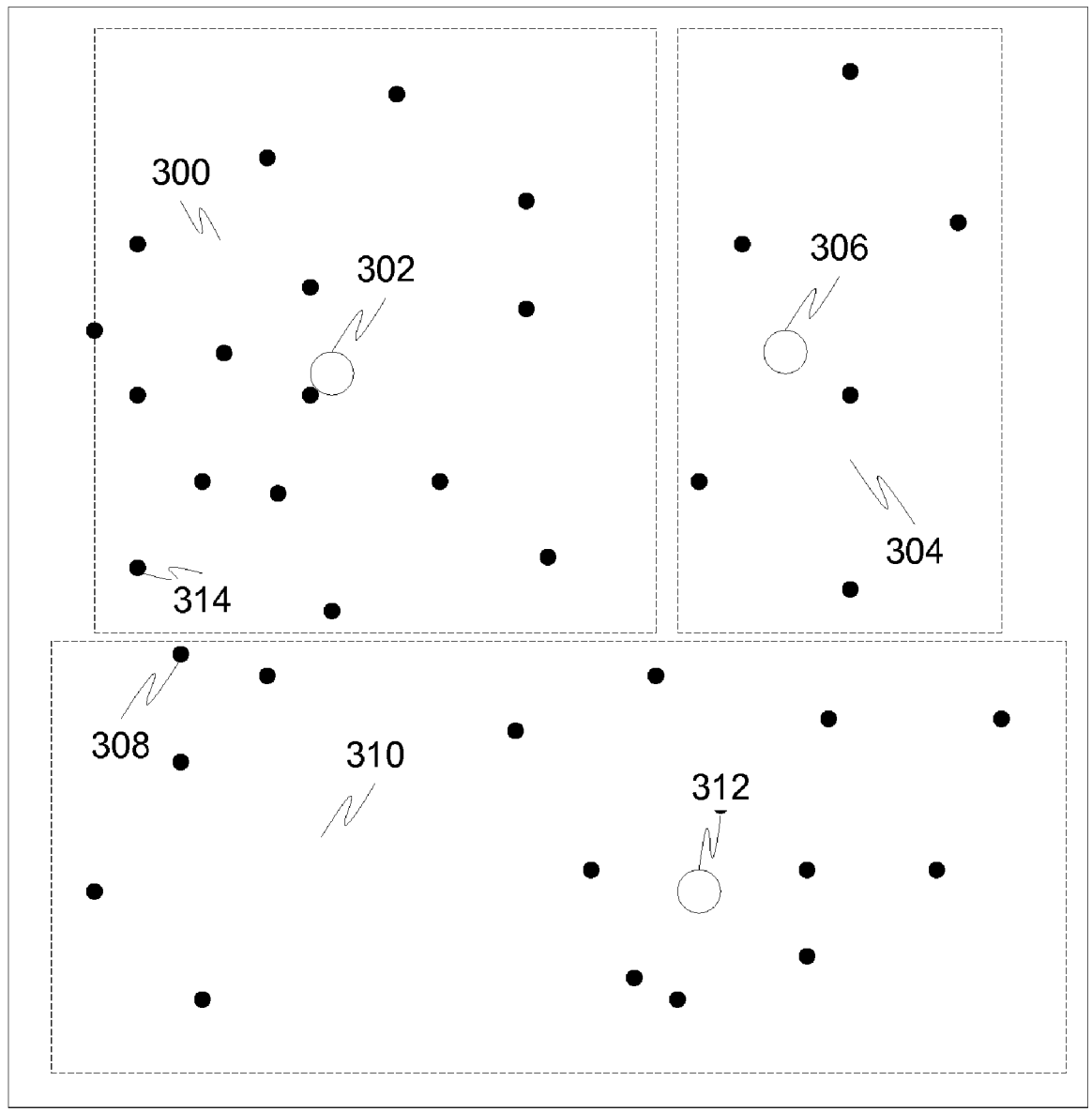
FIG. 3 is an example of the graph with the data points clustered.

One way to cluster the data points is to attempt to determine the optimum number of clusters for a given set of data points. This optimum number is known as K. There are a number of traditional techniques for making this determination, all of which are beyond the scope of this application. There are numerous drawbacks to this approach, however. K must be determined dynamically, and as such requires significant processing power, processing power that may be lacking in mobile devices. Additionally, K can be very difficult to determine with any degree of accuracy, and an incorrect guess can negatively impact both the clustering and recommendation accuracy. Given the partitioned clusters, one way to extract patterns is to compare the current data point with each of the cluster centroids and determine to which cluster the current data point belongs. The application patterns are then extracted from this cluster. For n-dimensional structures, a centroid is an intersection of all hyperplanes that divide X into two parts of equal moment about the hyperplane. Informally, it is the "average" or "mean" of all points of X. Thus, a centroid of a cluster is the mean of all points in the cluster. FIG. 3 is an example of the graph with the data points clustered. Cluster 300 has centroid 302 and Cluster 304 has centroid 306.

Comparing the centroids, however, may create a situation where certain neighboring data points may not be selected as one of the k neighboring data point, despite being close to the current data point, simply because they are part of clusters whose centroid is farther from the current data point than other centroids. One instance of such a case is depicted in FIG. 3, where data point 308 is part of cluster 310. Data point 308 is closer to cluster 300 than any of the data points in cluster 304, yet because the centroid 312 of cluster 310 is farther from the centroid 302 of cluster 300 than the centroid 306 of cluster 304, data point 308, despite being arguably the most similar to a relevant data point 314 in cluster 300, may not be used in the analysis.

In contrast to clustering, another way to extract patterns is to group neighboring data points nearest to the current data point. The nearest neighbors are those that are most similar to the current contexts and application usages. The application patterns are then extracted from these neighboring instances. This approach, however, requires that all of the existing data points be compared in order to find the neighbors, and thus is also not suitable for online computation on resource-limited devices such as mobile In an embodiment of the present invention, rather than estimating an "optimal" number of clusters before starting the clustering process, the number of clusters is dynamically chosen. Additionally, the number is chosen so as to result in compact (i.e., small) clusters. A threshold may be selected for the maximum number of points in a cluster and the clusters may be divided so that no cluster exceeds this threshold. In an alternative embodiment, rather than an upper threshold, a number representing the average number of points in a cluster may be selected and the data points clustered so that each cluster has at or near that number of data points. For example, if 5 is the average number of data points in each resulting cluster, and there are 3000 total data points in the usage data, then the data may be clustered into 600 clusters. Then, for each cluster, a centroid is computed and stored along with its containing data point. The compactness of a cluster may be measured by the average Euclidean distance from the data points in a cluster to the cluster's centroid. The smaller the average, the more compact a cluster is. The advantage of this approach is that, because the clusters are compact, the centroids better represent the data points in the corresponding clusters. This approach also does not require the resource-intensive task of deriving an optimal number for K.

When a new point comes in (i.e., a recommendation is to be made based on a current context), then this data point may be compared to the k closest neighboring centroids, rather than all of the data points. This greatly reduces the processing required to make the recommendation as it is no longer necessary to compare each individual data point to the new data point in order to derive accurate recommendations.

Figure 4:
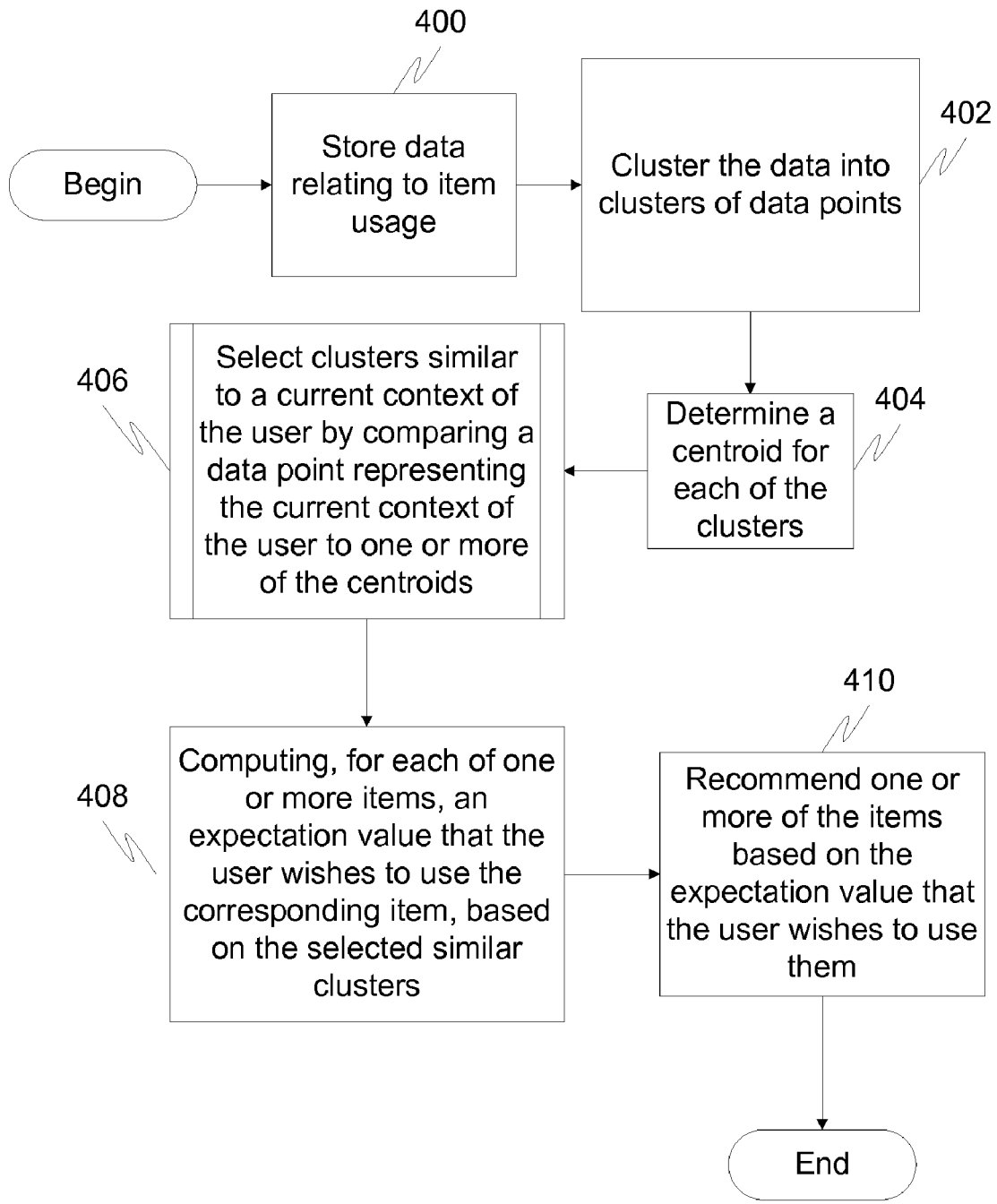
FIG. 4 is a flow diagram illustrating a method for making recommendations to a user in accordance with an embodiment of the present invention.

FIG. 4 is a flow diagram illustrating a method for making recommendations to a user in accordance with an embodiment of the present invention. Each step in this method may be embodied in hardware, software, or any combination thereof. The user may be utilizing an electronic device. This device may be a stationary device, such as a desktop computer, or may be a mobile device, such as a mobile phone, PDA, or laptop computer. One of ordinary skill in the art will recognize that other types of devices may be used with the present invention, and that nothing in this document shall be interpreted as limiting the device to any particular implementation.

At step 400, data relating to item usages of the user is stored. This data includes information as to items which were used by the user and the context in which they were used. The items may include any items that the user may find getting recommendations on as helpful. In one embodiment of the present invention, the items may include software applications running on the device. Thus, the user may find it helpful to receive recommendations on other, perhaps non-running, applications so that the user does not download, install, or run applications that have only a low probability that the user may be interested in them. In another embodiment of the present invention, the items may include computing services. This may include, for example, applications that run on other devices, such as remote games, diagnostic services, or anti-virus services. In another embodiment of the present invention, the items may include other information, such as, for example, movies, web sites, music, etc. One of ordinary skill in the art will recognize that many different types of objects may be recommended using various embodiments of the present invention. This usage data may be stored in, for example, vectors. The vectors may contain contexts concatenated with application usage values.

At step 402, the data is clustered into clusters of input data points. The actual clustering may be accomplished using a variety of clustering techniques. In one embodiment, k-means clustering may be utilized. In k-means clustering, a system assigns each point to the cluster whose centroid is nearest. Thus, this procedure becomes:

(1) Randomly generate k clusters and determine the cluster centers, or directly generate k random points as cluster centers. Alternatively, an initialization algorithm can be used.

(2) Assign each point to the nearest cluster center.

(3) Recompute the new cluster centers.

(4) Repeat the two previous steps until some convergence criterion is met (usually that the assignment hasn't changed).

The main advantages of using k-means clustering are its simplicity and speed which allows it to run on large datasets. Its disadvantage is that it does not yield the same result with each run, since the resulting clusters depend on the initial assignments Another possible clustering technique is the use of co-clustering. Given a multi-dimensional data matrix, co-clustering refers to simultaneous clustering along multiple dimensions. Thus, for example, not only the objects are clustered but also the features of the objects, i.e., if the data is represented in a data matrix, the rows and columns are clustered simultaneously. In a two-dimensional case it is simultaneous clustering of rows and columns, in contrast to clustering along a single dimension. Co-clustering has the advantage of handling sparse data points better.

Yet another possible clustering technique is vector quantization. Vector quantization is a technique borrowed from signal processing that allows the modeling of probability density functions by the distribution of prototype vectors. It works by dividing a large set of points (vectors) into groups having approximately the same number of points closest to them. Each group is represented by its centroid point, as in k-means and some other clustering algorithms.

One of ordinary skill in the art will recognize that there are other clustering techniques that can be used in the present invention. Nothing in this document shall be construed as requiring the use of any particular clustering technique.

At step 404, a centroid is determined for each of the clusters.

At step 406, clusters similar to a current context of the user are selected by comparing a data point representing the current context of the user to one or more of the centroids. In one embodiment of the present invention, the data point is compared to the centroids of each of the clusters. This comparison may include a series of steps. These steps are described in FIG. 5.

Figure 5:
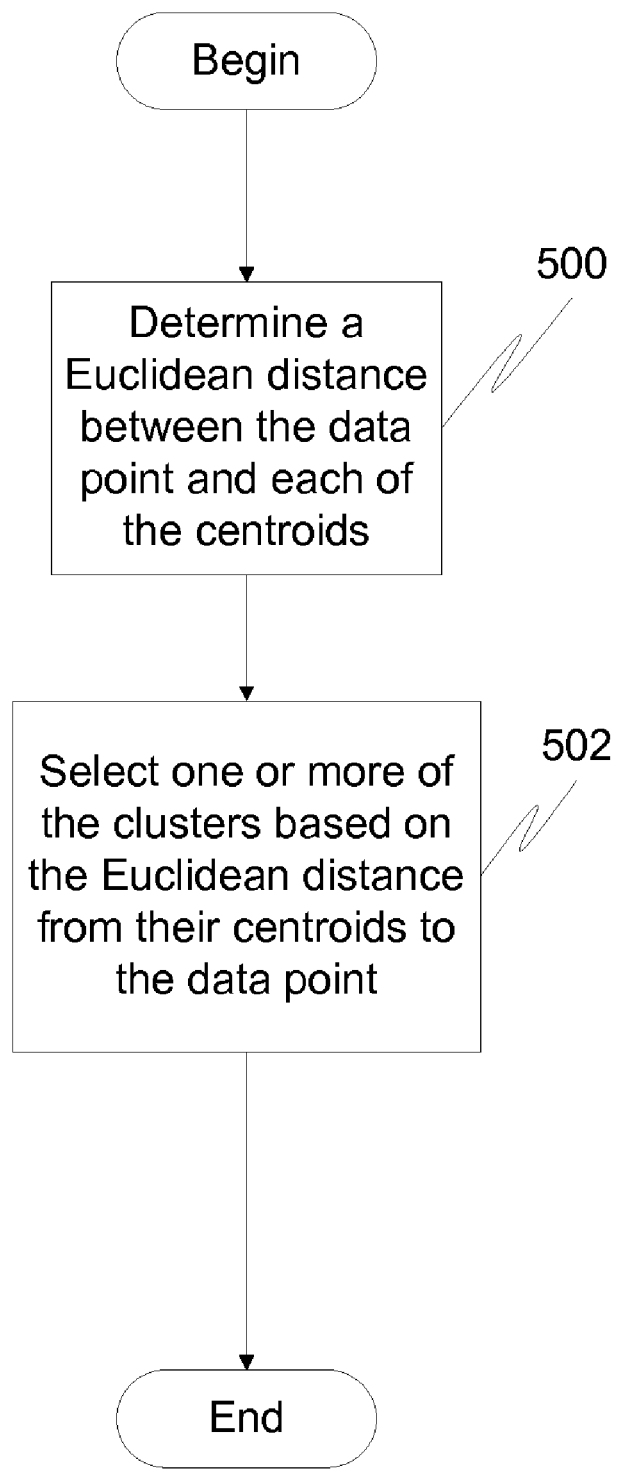
FIG. 5 is a flow diagram illustrating a method for selecting clusters similar to a current context of a user by comparing a data point representing the current context of the user to one or more of the centroids in accordance with an embodiment of the present invention.

FIG. 5 is a flow diagram illustrating a method for selecting clusters similar to a current context of a user by comparing a data point representing the current context of the user to one or more of the centroids in accordance with an embodiment of the present invention. Each step of this method may be embodied in software, hardware, or any combination thereof. At 500, a Euclidean distance between the data point and each of the centroids may be determined Various techniques exist for quickly and efficiently computing the Euclidean distance between data points. Such techniques are outside the scope of this disclosure, but one of ordinary skill in the art will recognize that any such technique may be utilized.

At 502, one or more of the clusters may be selected based on the Euclidean distance from their centroids to the data point. The closest centroids to the data point represent the most similar clusters to the data point.

Referring back to FIG. 4, once the one or more similar clusters have been selected, at 408 the system computes, for each of one or more items, an expectation value that the user wishes to use the corresponding item, based on the selected similar clusters. The expectation value reflects the chances that the user will wish to use the corresponding item. One of ordinary skill in the art will recognize that this may be accomplished in many different ways. One way is to compute a centroid vector of the data points in the selected clusters. The centroid vector then represents the expectation value of usage pattern for each item.

At step 410, one or more of the items may be recommended based on the expectation value that the user wishes to use them. The number of items to recommend may be determined in a number of different ways. It should be noted that this embodiment may be applied to recommendation of items even without utilizing the previously described embodiments relating to the clustering of the data and selection of similar clusters. In other words, the thresholding technique may be applied to many different recommendation systems, and should not be interpreted as being limited to the exact recommendation systems described in this document unless expressly stated.

In one embodiment, the system recommends x items having the highest expectation value that the user wishes to use them, wherein x is dynamically determined by using the average number of items that have been used in the selected clusters. In another embodiment of the present invention, x is simply a preset value selected by an administrator.

In another embodiment of the present invention, a threshold is computed for each possible item to be recommended. This computation may be performed at the recommendation stage. A threshold $T_i$ (threshold for the i-th application) can be computed, for example, by computing the mean of all centroid values for an application $A_i$. This may be expressed as follows:

$$T_i = \frac{1}{M} \sum_{j=1}^{M} m_{ij}$$

wherein M is the number of possible items considered for recommendation, $m_{ij}$ represents the centroid of the application $A_i$ for situation j, and $m_i$ is a variable that can have values of $m_{ij}$'s for all j's.

This embodiment may be modified to correct for wide variations in the centroid values. Specifically, a situation may occur where the mean value does not accurately represent a good threshold for a grouping of centroid values if there is a wide variation between the values. This is because a few outlier values could throw off the computation of the mean. As such, an alternative embodiment is described wherein a scaled standard deviation of the centroid values is included in the equation as follows.

$$T_i = \frac{1}{M} \sum_{j=1}^{M} m_{ij} + \alpha_1 \cdot std(m_i)$$

wherein $\alpha_i$ is a parameter that is determined experimentally according to the data properties of i. By experimentally, this means that test data may be utilized to execute a run-through of the recommendation process, and the value of $\alpha_i$ may be adjusted until the recommendations match a desired set of recommendations. It should be noted that this equation will be identical to the previous equation when $\alpha_i$ is set at 0.

Figure 6:
FIG. 6 is a block diagram illustrating a system in accordance with an embodiment of the present invention.

FIG. 6 is a diagram illustrating an example of a table having the values for the centroids of a number of clusters for individual items in accordance with an embodiment of the present invention. In one embodiment of the present invention, the table may actually be created by the system and utilized. However, other embodiments of the invention may elect not to actually create this table or any table like it but rather merely temporarily store computed values in other data structures. As such, this table may simply be viewed as a representation of sample data and may not actually represent a physical data structure created by the system.

Figure 7:
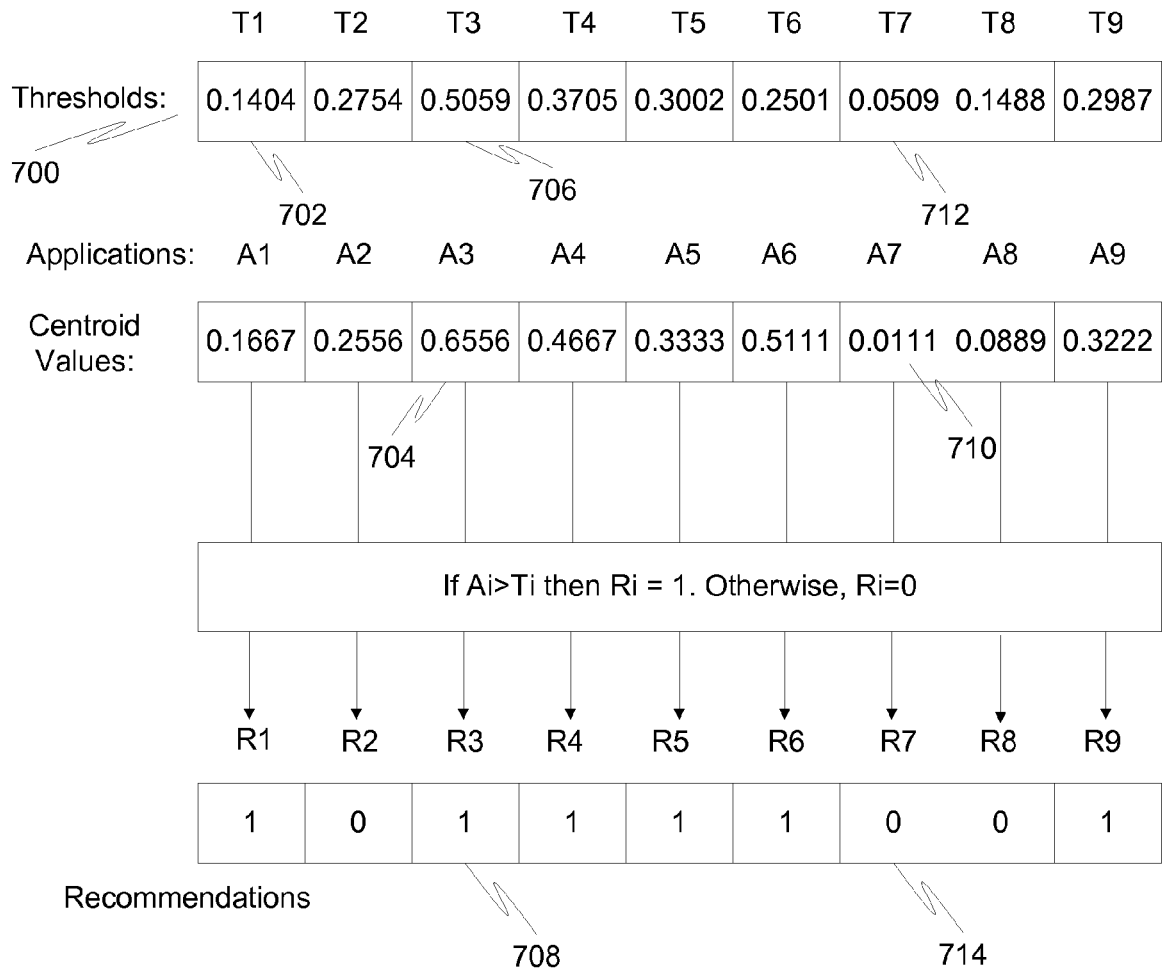
FIG. 7 is a diagram illustrating an example of individual thresholds for each possible item to recommend in accordance with an embodiment of the present invention.

The table has a list of the centroids of the clusters on one axis 600. Here, there are 12 centroids, each representing one of 12 clusters. The table also has a list of possible items to recommend on the other axis 602. Here, there are 9 possible items to recommend. Using the formulas described above, the system may compute individual thresholds for each possible item to recommend and utilize them in determining whether to recommend the item. FIG. 7 is a diagram illustrating an example of individual thresholds for each possible item to recommend in accordance with an embodiment of the present invention. Here, threshold values 700 are computed from the columns of the table in FIG. 6. Thus, for example, threshold 702 is computed by finding the mean of the values in column 604 of FIG. 6 (possibly corrected for the standard deviation as described in the second formula above). When the user wishes to obtain a recommendation for an application, the centroid value for the cluster that is most similar to the current context may be compared against the threshold values. For example, suppose in FIG. 6 that it is determined that the second cluster 606 is determined to be most similar to the context in which the user is operating. The centroid values in the row corresponding to the second cluster 606 are then utilized (as shown in FIG. 7) and compared against the individual threshold values. In FIG. 7, for example, it is determined that the value for item A1 704 is greater than the threshold for that item 706. As such, the item may be recommended (indicated here by placing a "1" in a recommendation record for that item, 708). The value for item A2 710 is lower than the threshold for that item 712. As such, the item may not be recommended (indicated here by placing a "0" in the recommendation record for that item, 714). Similar comparisons are made for each of the possible items to recommend.

At the end of this process, a list of items to recommend has been compiled. This list may be utilized in a number of ways. One way is to simply recommend all the items that it has been determined should be recommended. The user's display, however, may be limited. In such (or potentially other) situations, it may be beneficial to limit the number of recommendations to a maximum. In such a case, the exact items to be recommended may be culled from the recommended list in a number of ways. One way would be simply to randomly pick some of the items to recommend from the ones the system indicates are recommendable. Another way is to pick a certain number of the items having the highest centroid values. For example, in the example in FIG. 7, the system may select the top three items to recommend by looking first to the items that are indicated as recommendable (A1, A3, A4, A5, A6, and A9) and then selecting the three having the highest centroid values (A3, A6, A4).

This embodiment is also useful as an alternative to simply selecting the top n items having the highest centroid values, for example, as it may turn out that there aren't in items that the system would ordinarily recommend. For example, even though the user's display may be capable of displaying 7 items to recommend, it may turn out that the threshold computations indicate that only 6 items are recommendable. Without using the method, the system may have listed an item for the user that really wasn't recommendable.

This approach also provides flexibility for strategically adjusting individual thresholds according to application purposes. For example, the thresholds can be lowered to increase the accuracy of recommending applications that should be recommended. Conversely, the thresholds can be raised to allow for more recommendations to be available to the user.

In another embodiment of the present invention, rather than using independent thresholds for each potential item to be recommended, a single general threshold is used for all applications. The general threshold may be computed, for example using the following equation to find the global mean of all application centroids:

$$\text{Threshold} = \frac{1}{NM} \sum_{i=1}^{N} \sum_{j=1}^{M} m_{ij}$$

wherein N is the number of items considered for recommendation, M is the number of situations considered for recommendation, $m_{ij}$ represents the centroid of the application $A_i$ for situation j.

As with the case of individual thresholds, a correction based on standard deviation may also be included in this formula as follows for the same reasons:

$$\text{Threshold} = \frac{1}{NM} \sum_{i=1}^{N} \sum_{j=1}^{M} m_{ij} + \alpha \cdot std(m)$$

wherein m is a variable that can have values of $m_{ij}$'s for all j's.

FIG. 8 is a diagram illustrating an example of a general threshold for all possible items to recommend in accordance with an embodiment of the present invention. Here, the threshold is determined to be 0.25, and the recommendations made accordingly.

It should also be noted that, in order to increase computing efficiency, it may be desirable to perform some of the steps of the method of FIGS. 4-5 during a device's idle time (offline). More specifically, in instances where the user's device is not being used or is lightly used, it becomes beneficial to perform some of the operations described above to maximize the availability of a processor of the user's device and to reduce the response time when the actual recommendation is requested (online).

Many of the steps involved in the gathering and clustering of the data itself can be performed while offline.

In another embodiment of the present invention, the probability-based solution described above may be combined with other techniques to improve the recommendation process. For example, a solution based on user-selected preferences was previously described in this document. While such a solution is very limited when utilized alone, if such a preference-based solution were combined with the probability-based solution described above, it may act to improve upon either solution operated alone. Such a solution might involve, for example, weighting the probabilities determined for a given context based upon the user preferences. For example, in a previously presented example, the probability that the user might wish to run a word processing application while at work and in the morning was listed at 0.89. However, perhaps this particular user prefers to play game applications while at work in the morning, because the user's boss does not come into work until the afternoon. If the user indicated that fact by providing a preference for game applications, the probability that the user might wish to run a word processing application may be reduced (or the probability that the user might wish to run a game application may be increased) by a weighting. In another embodiment of the present invention, the preferences may even be granularized to the same level as the tracked contexts, such that the user could expressly indicate a fondness for game applications while at work and during the mornings.

In an alternative combination of the probability-based solution and preference-based solution, the system may be designed to simply use the preference-based solution or a combination of the preference and probability-based solutions when preferences are indicated by a user, but to simply use the probability-based solution where no preferences are indicated. This allows preference-based information to still be utilized even when a large number of the users elect not to specify preferences, or where a user wishes to provide preferences for certain contexts but not others.

Figure 9:
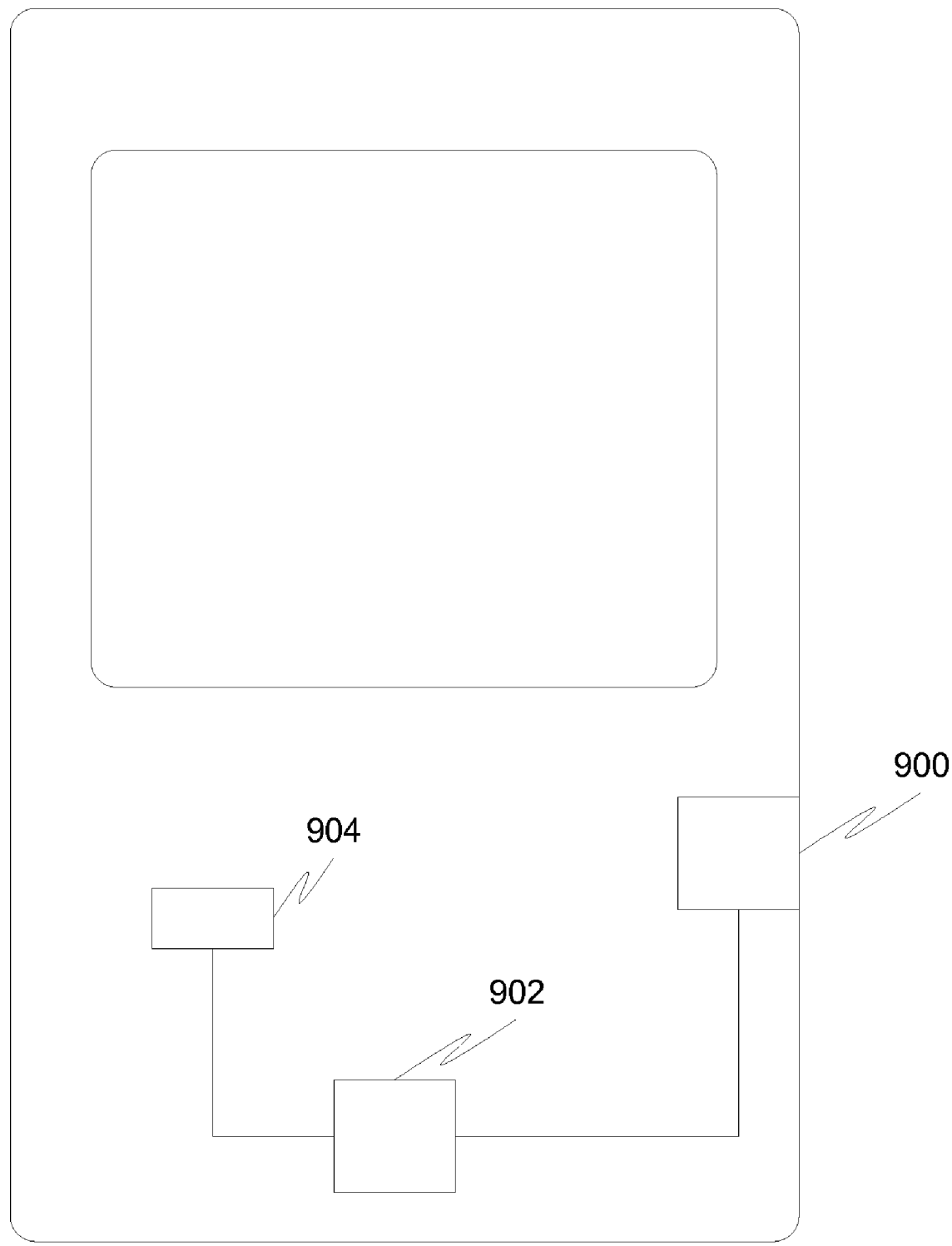
FIG. 9 is a block diagram illustrating a system in accordance with an embodiment of the present invention. In this diagram the system is a mobile device.

FIG. 9 is a block diagram illustrating a system in accordance with an embodiment of the present invention. In this diagram the system is a mobile device. One of ordinary skill in the art will recognize, however, that the system may be embodied in many different devices or in groups of devices. For example, the system may comprise a mobile device having a processor that performs some of the recited steps and also comprise a server that performs other of the recited steps. In another example, the system may comprise a desktop computer.

The system may include an interface 900 and one or more processors 902. The processors may be configured to perform some or all of the steps recited in FIGS. 4-5 and the corresponding text above. Additionally, when the system includes a mobile device, it may include a load detection module 904. The load detection module may detect the load level of processor 902 (i.e., how busy the processor is). In such a case, the one or more processors may then be configured to perform the storing, and clustering, and determining when the device is not being used or is lightly used and to perform the selecting, computing, and recommending when the actual recommendation is requested by a user.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for making recommendations to a user, the method comprising:
   retrieving data relating to usage patterns of the user, wherein the data includes item usage information and item context information, wherein the item context information includes the situations in which the user or device operated by the user is operating when the items were used;
   clustering the data into clusters of data points;
   determining a centroid for each of the clusters;
   selecting a cluster similar to a current context of the user by comparing a data point representing a current context of the user or device to one or more of the centroids; and
   computing, for an item, a threshold based on values for a plurality of the centroids with respect to the item, wherein a threshold is used to compare with centroid value of the item in the selected cluster to determine whether to recommend the item.

2. The method of claim 1, wherein the comparing a data point includes comparing a context portion of a data point representing a current context of the user or device to a context portion of one or more of the centroids.

3. The method of claim 1, further comprising recommending one or more items based on the computing.

4. The method of claim 1, wherein the computing includes computing the mean of the values for the plurality of centroids with respect to corresponding item.

5. The method of claim 1, wherein the computing includes determining the threshold using the following formula:

$$T_i = \frac{1}{M} \sum_{j=1}^{M} m_{ij} + \alpha_i \cdot std(m_i)$$

wherein M is the number of possible items considered for recommendation, $m_{ij}$ represents the centroid of the application $A_i$ for situation j, $m_i$ is a variable that can have values of $m_{ij}$'s for all j's, and $\alpha_i$ is a constant.

6. The method of claim 1, wherein the item comprises a software application, computing service, or data.

7. A method for making recommendations to a user, the method comprising:
   retrieving data relating to usage patterns of the user, wherein the data includes item usage information and item context information, wherein the item context information includes the situations in which the user or device operated by the user is operating when the items were used;
   clustering the data into clusters of data points;
   determining a centroid for each of the clusters;
   selecting a cluster similar to a current context of the user by comparing a data point representing the current context of the user to one or more of the centroids;
   computing a general threshold based on values for the plurality of the centroids with respect to a plurality of possible items to recommend, wherein the general threshold is used to compare with centroid value of an item in a selected cluster to determine whether to recommend the item.

8. The method of claim 7, wherein the comparing a data point includes comparing a context portion of a data point representing a current context of the user or device to a context portion of one or more of the centroids.

9. The method of claim 7, further comprising recommending one or more items based on the computing.

10. The method of claim 7, wherein the computing includes computing the mean of the values for the plurality of centroids.

11. The method of claim 7, wherein the computing includes determining the threshold using the following formula:

$$\text{Threshold} = \frac{1}{N-M} \sum_{i=1}^{N} \sum_{j=1}^{M} m_{ij} + \alpha \cdot std(m)$$

wherein N is the number of items considered for recommendation, M is the number of situations considered for recommendation, $m_{ij}$ represents the centroid of the application $A_i$ for situation j, and m is a variable that can have values of $m_{ij}$'s for all j's.

12. The method of claim 7, wherein the items comprise software applications, computing services, or data.

13. A mobile device comprising:
   a display that is unable to display more than a particular number of a plurality of items;
   one or more processors configured to:
      retrieve data relating to usage patterns of the mobile device, wherein the data includes item usage information and item context information, wherein the item context information includes the situations in which mobile device is operating when the items were used;
      cluster the data into clusters of data points;
      determine a centroid for each of the clusters;
      select a cluster similar to a current context of the user by comparing a data point representing a current context of the user or device to one or more of the centroids; and
      compute, for an item, a threshold based on values for a plurality of the centroids with respect to the item, wherein a threshold is used to compare with centroid value of the item in the selected cluster to determine whether to display the item on the display.

14. The mobile device of claim 13, wherein the mobile device is a mobile phone.

15. The mobile device of claim 13, wherein the mobile device is a tablet computer.

16. A mobile device comprising:
   a display that is unable to display more than a particular number of a plurality of items;
   one or more processors configured to:
      retrieve data relating to usage patterns of the user, wherein the data includes item usage information and item context information, wherein the item context information includes the situations in which the user or device operated by the user is operating when the items were used;
      cluster the data into clusters of data points;
      determine a centroid for each of the clusters;
      select a cluster similar to a current context of the user by comparing a data point representing the current context of the user to one or more of the centroids;
      compute a general threshold based on values for the plurality of the centroids with respect to a plurality of possible items to recommend, wherein the general threshold is used to compare with centroid value of an item in a selected cluster to determine whether to display the item on the display.

17. The mobile device of claim 16, wherein the mobile device is a mobile phone.

18. The mobile device of claim 16, wherein the mobile device is a tablet computer.

19. A program storage device readable by a machine tangibly embodying a program of instructions executable by the machine to perform a method for making recommendations to a user, the method comprising:
- retrieving data relating to usage patterns of the user, wherein the data includes item usage information and item context information, wherein the item context information includes the situations in which the user or device operated by the user is operating when the items were used;
- clustering the data into clusters of data points;
- determining a centroid for each of the clusters;
- selecting a cluster similar to a current context of the user by comparing a data point representing a current context of the user or device to one or more of the centroids; and
- computing, for an item, a threshold based on values for a plurality of the centroids with respect to the item, wherein a threshold is used to compare with centroid value of the item in the selected cluster to determine whether to recommend the item.

20. A program storage device readable by a machine tangibly embodying a program of instructions executable by the machine to perform a method for making recommendations to a user, the method comprising:
- retrieving data relating to usage patterns of the user, wherein the data includes item usage information and item context information, wherein the item context information includes the situations in which the user or device operated by the user is operating when the items were used;
- clustering the data into clusters of data points;
- determining a centroid for each of the clusters;
- selecting a cluster similar to a current context of the user by comparing a data point representing the current context of the user to one or more of the centroids;
- computing a general threshold based on values for the plurality of the centroids with respect to a plurality of possible items to recommend, wherein the general threshold is used to compare with centroid value of an item in a selected cluster to determine whether to recommend the item.

* * * * *